United States Patent
McLin et al.

(10) Patent No.: US 11,293,263 B2
(45) Date of Patent: Apr. 5, 2022

(54) QUICK CLOSING VALVE SYSTEM AND METHODOLOGY

(71) Applicant: Cameron International Corporation, Houston, TX (US)

(72) Inventors: Jermetris McLin, Katy, TX (US); Mark McGilvray, Jr., Katy, TX (US); Jerry Martino, Houston, TX (US); Carl Toups, Houston, TX (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 129 days.

(21) Appl. No.: 16/741,265

(22) Filed: Jan. 13, 2020

(65) Prior Publication Data

US 2021/0215019 A1 Jul. 15, 2021

(51) Int. Cl.
*E21B 34/10* (2006.01)
*F15B 3/00* (2006.01)
*F15B 15/22* (2006.01)
*F16K 3/32* (2006.01)

(52) U.S. Cl.
CPC .............. *E21B 34/102* (2013.01); *F15B 3/00* (2013.01); *F15B 15/225* (2013.01); *F16K 3/32* (2013.01)

(58) Field of Classification Search
CPC .......... E21B 34/102; E21B 34/02; F16K 3/32; F15B 15/225; F15B 3/00
See application file for complete search history.

(56) References Cited

U.S. PATENT DOCUMENTS

| 6,102,828 | A  | * | 8/2000  | MacKenzie  | E21B 33/0355 475/263 |
| 6,684,897 | B2 | * | 2/2004  | Sundararajan | F16K 31/122 137/15.19 |
| 10,274,090 | B2 | * | 4/2019 | Ferreira | F16K 31/1221 |
| 2010/0126161 | A1 | * | 5/2010 | Rose | F02N 7/00 60/414 |
| 2014/0096676 | A1 | * | 4/2014 | Young | F16J 10/04 91/418 |
| 2015/0076378 | A1 | * | 3/2015 | Sundararajan | F16K 31/122 251/63.5 |
| 2015/0144816 | A1 | * | 5/2015 | Hoang | F16K 31/1221 251/31 |
| 2015/0198186 | A1 | * | 7/2015 | Mcevoy, Jr | F15B 15/149 251/25 |
| 2015/0308465 | A1 | * | 10/2015 | Krondorfer | A01M 1/103 91/358 R |
| 2019/0376610 | A1 | * | 12/2019 | McEvoy | F16K 31/56 |
| 2021/0199201 | A1 | * | 7/2021 | Choate | F16K 3/0254 |

* cited by examiner

*Primary Examiner* — Michael R Wills, III
(74) *Attorney, Agent, or Firm* — Helene Raybaud (57) ABSTRACT

A technique facilitates rapid transitioning of a valve, e.g. a gate valve. According to an embodiment, a system comprises a valve actuator constructed for coupling with a valve to actuate the valve between closed and open positions. Hydraulic actuation fluid may be supplied to the valve actuator under pressure via a hydraulic supply system to enable selective shifting of the valve actuator, and thus the valve, from a closed position to an open position. The system also comprises a dump tank coupled to the valve actuator in a manner to receive hydraulic fluid. In a rapid valve actuation operation, e.g. closing operation, the dump tank receives hydraulic fluid from the valve actuator rather than returning the hydraulic fluid to the hydraulic supply system. This, in turn, enables rapid shifting of the valve actuator and thus rapid shifting of the valve.

19 Claims, 7 Drawing Sheets

QUICK CLOSING VALVE SYSTEM AND METHODOLOGY

BACKGROUND

Various types of wells are used in the production of hydrocarbon fluids such as oil and gas. For example, production wells may be used in producing well fluids from a subterranean formation to a surface collection location. During various well production operations and/or well servicing operations, valves are operated to control the flow of fluids. A valve may be combined with a valve actuator which receives hydraulic fluid under pressure to shift the valve to an open flow position. In certain situations, e.g. emergency situations, it is desirable to shift the valve to a closed position rapidly. However, many types of hydraulic systems effectively restrict the outflow of hydraulic fluid from the valve actuator which slows closing of the valve.

SUMMARY

In general, a system and methodology are provided for facilitating the rapid shifting of a valve, e.g. a gate valve. According to an embodiment, a system comprises a valve actuator constructed for coupling with a valve to actuate the valve between closed and open positions. Hydraulic actuation fluid may be supplied to the valve actuator under pressure via a hydraulic supply system to enable selective shifting of the valve actuator, and thus the valve, from a first operational position, e.g. a closed position, to a second operational position, e.g. an open position. The system also comprises a dump tank coupled to the valve actuator in a manner to receive hydraulic fluid. In a rapid valve shifting operation, e.g. closing operation, the dump tank receives hydraulic fluid from the valve actuator rather than returning the hydraulic fluid to the hydraulic supply system. This, in turn, enables rapid shifting of the valve actuator and thus rapid shifting/closing of the valve.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The disclosure herein generally involves a system and methodology for facilitating rapid transitioning, e.g. closing, of a valve. By way of example, the valve may be a gate valve or other type of valve used in a well system to facilitate production of well fluids and/or servicing of a well. The valve may be used in many types of well systems, including land-based well systems and subsea well systems. In some applications, the technique enables rapid closing of the valve during an emergency closing operation by dumping hydraulic actuating fluid directly from the valve actuator into a dump tank. It should be noted the valve also may be employed in various other industrial valve applications in which hydraulic systems are used to actuate valves which may benefit from fast valve closing times. In addition to well applications, such fast closing valves may be used in the food processing industry, the petrochemical industry, and in a variety of other industries.

According to an embodiment, a valve system comprises a valve actuator constructed for coupling with a valve to actuate the valve between operational positions, e.g. between closed and open positions. Hydraulic actuation fluid is supplied to the valve actuator under pressure via a hydraulic supply system to enable selective shifting of the valve actuator. By way of example, the hydraulic actuation fluid may be introduced into the valve actuator to shift the valve actuator, and thus the valve, from a first operational position, e.g. a closed position, to a second operational position, e.g. an open position. The valve system also comprises a dump tank coupled to the valve actuator in a manner to receive hydraulic fluid. In a rapid closing operation, for example, the dump tank receives hydraulic fluid from the valve actuator rather than returning the hydraulic fluid to the hydraulic supply system. This, in turn, enables much more rapid shifting of the valve actuator and thus rapid closing of the valve.

Figure 1:
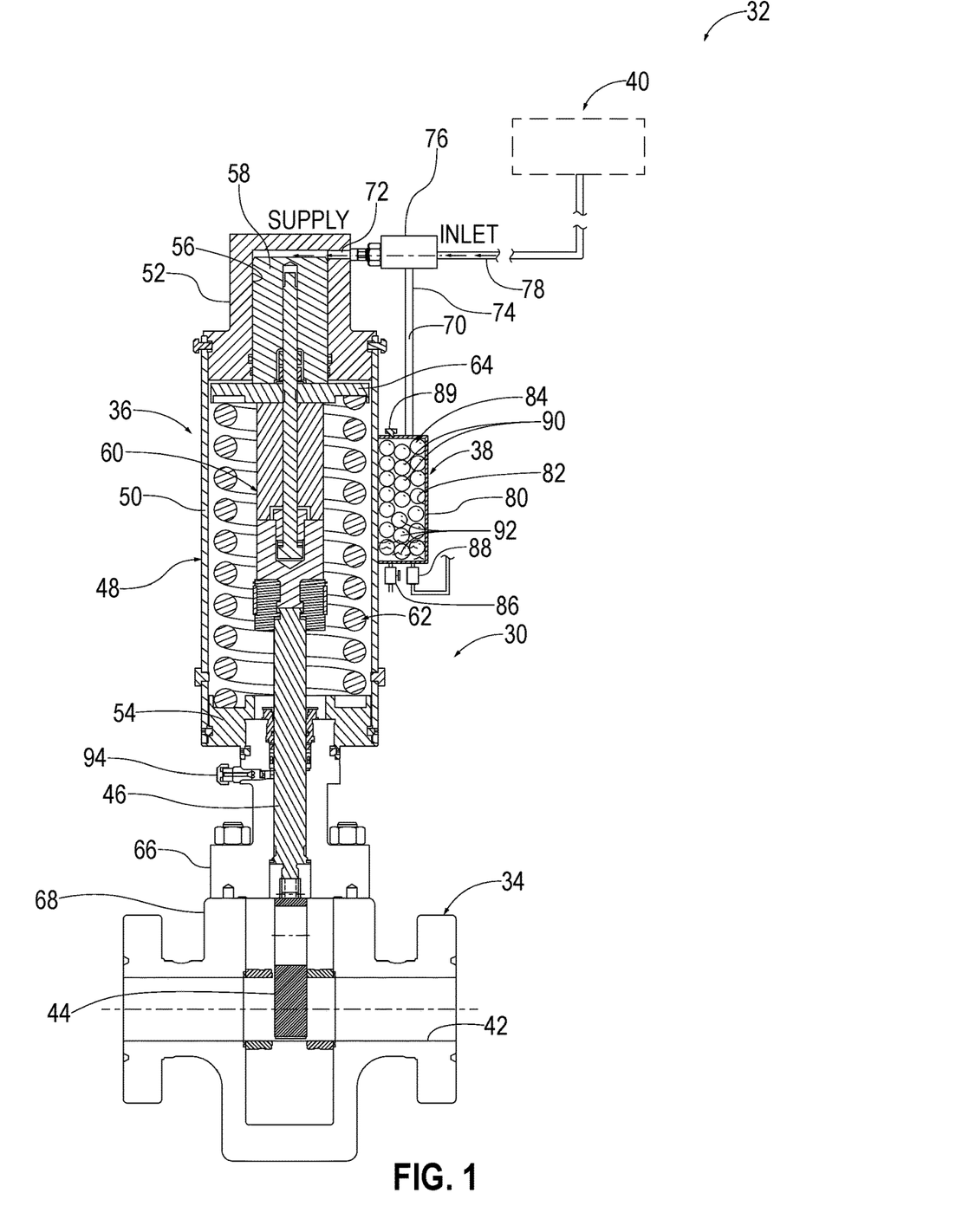
FIG. 1 is a cross-sectional illustration of an example of a hydraulic valve actuator coupled with a dump tank and a valve, according to an embodiment of the disclosure.

Referring generally to FIG. 1, an embodiment of a valve system 30 is illustrated as part of an overall well system 32. In this example, the valve system 30 comprises various components such as a valve 34, a valve actuator 36, a dump tank 38, and a hydraulic fluid supply system 40. The valve 34 may be actuated between operational positions, e.g. closed and open positions, to control fluid flow along a flow passage 42. By way of example, the valve 34 may be in the form of a gate valve having a gate 44 shiftable between a closed flow position and an open flow position.

In the embodiment illustrated, the valve actuator 36 is operatively coupled with valve 34 via an actuator member 46, e.g. a rod coupled with gate 44. The valve actuator 36 further comprises an actuator housing 48 which may be constructed with a shell 50 connected between a first end 52 and a second end 54. At least a portion of the actuator housing 48, e.g. first end 52, defines a piston chamber 56 for slidably receiving a piston 58.

The piston 58 may be connected with the actuator member 46, e.g. rod, via a piston coupling system 60. In the example illustrated, the piston 58 is spring biased via a spring member 62, e.g. a coiled spring. By way of example, the spring member 62 may be positioned between a spring plate 64 and second end 54. The spring plate 64 may be part of piston 58 or otherwise suitably coupled with piston 58 for movement along the interior of actuator housing 48. Accordingly, movement of the spring plate 64 and piston 58 causes corresponding movement of actuator member 46 and thus transition of valve 34 between operational positions. Depending on the type of valve 34 and type of actuator housing 48, various mounting hardware 66, e.g. flanges, may be used to mechanically mount the valve actuator 36 to a valve housing 68 of valve 34.

Referring again to FIG. 1, the dump tank 38 may be placed in fluid communication with the valve actuator 36. For example, the dump tank 38 may be placed in fluid communication with piston chamber 56 via a flow passage 70 and at least one piston actuator port 72. As illustrated, the piston actuator port(s) 72 may extend through actuator housing 48 and into fluid communication with piston chamber 56. The flow passage 70 may connect port 72 with an interior of dump tank 38 via, for example, a flow line 74 and a corresponding valve or valves 76, e.g. a quick exhaust valve, positioned along the flow line 74.

The at least one piston actuator port 72 also may be connected with hydraulic fluid supply system 40 via a hydraulic fluid supply line 78. In some embodiments, the hydraulic fluid supply line 78 is coupled with the at least one actuator port 72 through the quick exhaust valve 76 or through other suitable corresponding valve(s) 76 which direct the actuating fluid to piston chamber 56 rather than dump tank 38. In this manner, the hydraulic fluid supply system 40 may supply hydraulic fluid to the piston chamber 56 for actuation of valve 34 between operational positions as described in greater detail below.

The dump tank 38 may be constructed in various configurations and may comprise a dump tank housing 80 defining an interior 82. In some embodiments, an energizer element 84 is positioned in the dump tank 38 to energize hydraulic fluid which is received in the interior 82 of dump tank 38. The energizer element 84 stores energy as hydraulic fluid fills the dump tank 38 and this stored energy is used to facilitate discharge of the hydraulic fluid from the interior 82 of dump tank 38. For example, the energizer element 84 may be used to help mechanically push hydraulic fluid away from the valve actuator 36. Additionally, the energizer element 84 may serve as a built-in dampener.

After hydraulic fluid is received in dump tank 38 during a given valve operation, for example, the hydraulic fluid may subsequently be discharged from dump tank 38. Depending on the embodiment, the hydraulic fluid may subsequently be discharged via a suitable drain valve 86 and/or return valve 88 coupled with hydraulic fluid supply system 40. In some embodiments, the dump tank 38 also may comprise a pressure relief device 89, e.g. a pressure release check valve or relief plug.

The energizer element 84 may have various configurations, such as the illustrated compressible elements 90 containing a suitable gas, e.g. air. The compressible elements 90 may be in the form of compressible balls 92 such as air sealed elastic balls. However, other types of internal or external energizer elements 84 may be employed to facilitate subsequent emptying of dump tank 38. Such other energizer elements 84 may include pumps, gravity feed systems, suction systems, and/or other systems which facilitate discharge of hydraulic fluid from dump tank 38. It should be noted that depending on the parameters of a specific application, the valve actuator 36 may comprise various other components and features, such as appropriate fittings 94, e.g. grease fittings and/or pressure release fittings.

Figure 2:
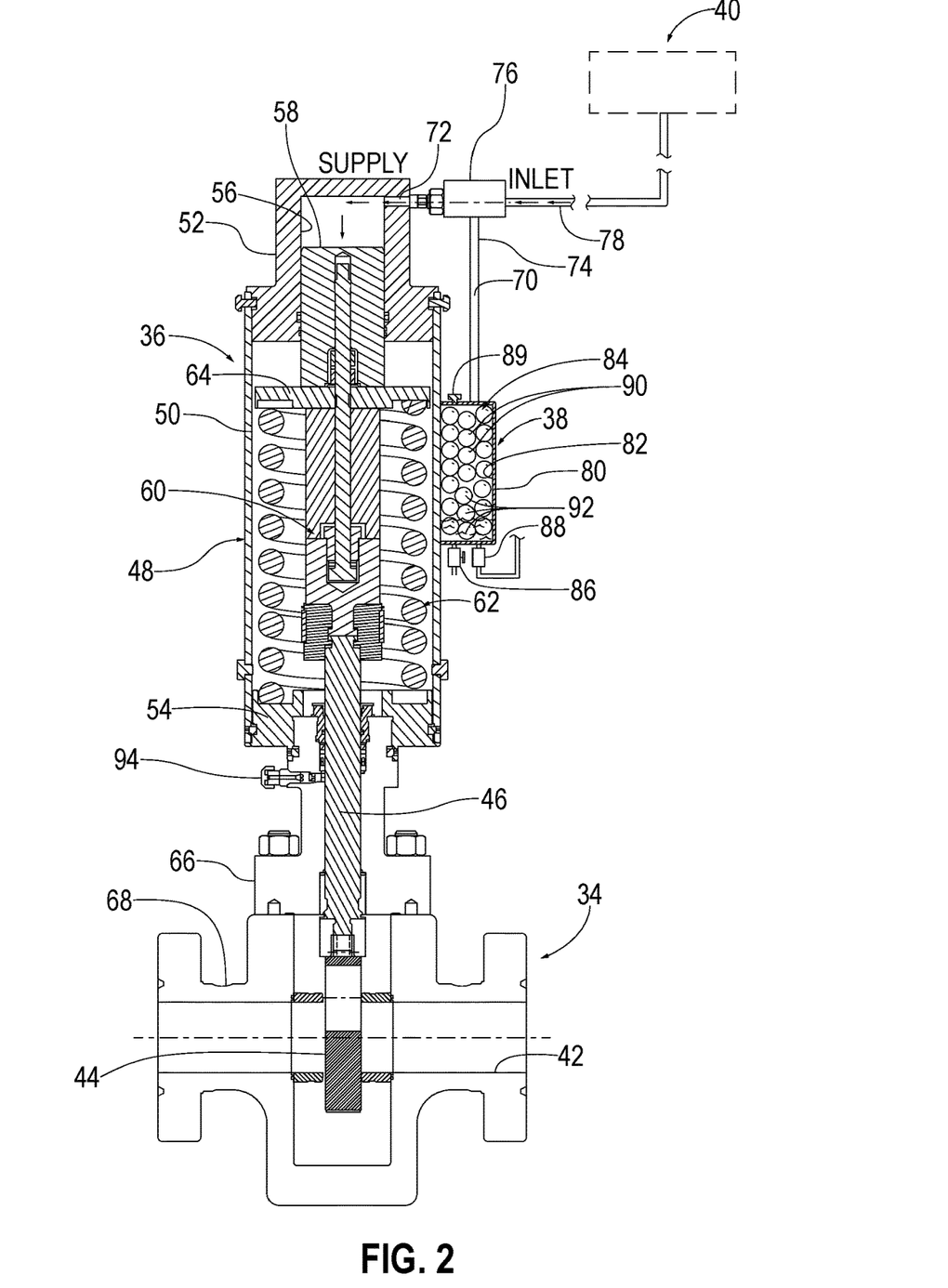
FIG. 2 is a cross-sectional illustration similar to that of FIG. 1 but showing the hydraulic valve actuator and the valve in a different operational position, according to an embodiment of the disclosure.

In an example operation, valve 34 is initially in a closed position, as illustrated in FIG. 1. Hydraulic fluid supply system 40 is operated to introduce hydraulic fluid under pressure into valve actuator 36 via port 72. As the hydraulic fluid flows from supply system 40, through valve 76, through port 72, and into piston chamber 56, the piston 58 begins to move along piston chamber 56 against the bias of spring member 62. The movement of piston 58 causes actuator member 46 to begin shifting valve 34 to an open flow position, as illustrated in FIG. 2.

Figure 3:
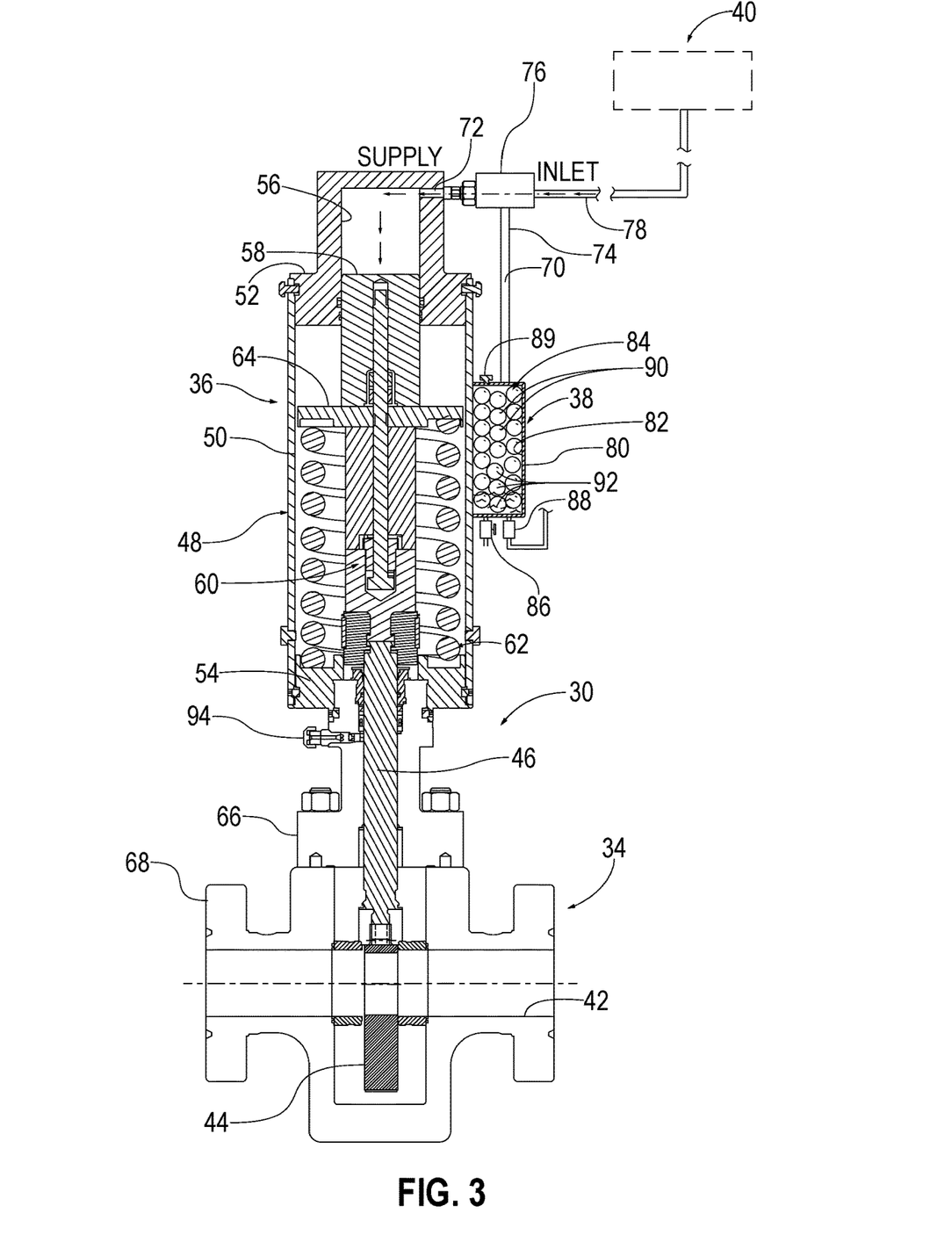
FIG. 3 is a cross-sectional illustration similar to that of FIG. 2 but showing the hydraulic valve actuator and the valve in a different operational position, according to an embodiment of the disclosure.
Figure 4:
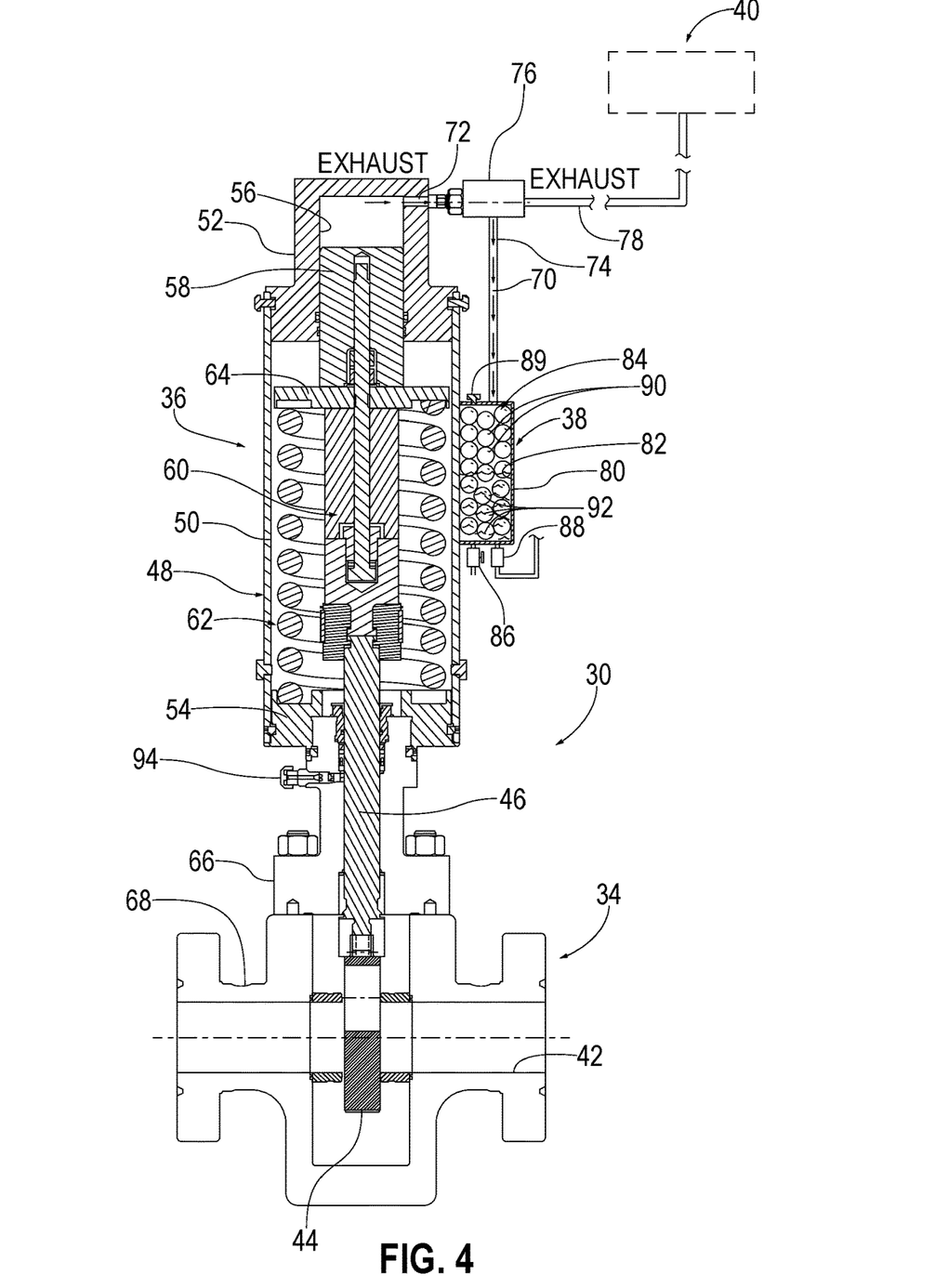
FIG. 4 is a cross-sectional illustration similar to that of FIG. 3 but showing the hydraulic valve actuator and the valve in a different operational position, according to an embodiment of the disclosure.

Hydraulic fluid may continually be introduced into piston chamber 56 to move piston 58 until valve 34 is in a fully open position, as illustrated in FIG. 3. If valve 34 is a gate valve having gate 44, the gate 44 is shifted linearly until valve 34 is in the fully open position to accommodate flow along flow passage 42. If rapid closing of valve 34 is desired in, for example, an emergency closing situation, the pressure applied via hydraulic fluid supply system 40 is suddenly reduced or eliminated. This allows spring member 62 to begin moving piston 58 in an opposite direction toward a closed position, as illustrated in FIG. 4.

The hydraulic fluid in piston chamber 56 is rapidly moved out through port 72 and into the interior 82 of dump tank 38 rather than directing the hydraulic fluid back into hydraulic fluid supply system 40. This allows the valve actuator 36 and valve 34 to rapidly transition to the closed position illustrated in FIG. 5. It should be noted that many types of hydraulic fluid supply systems 40 comprise relatively long hydraulic lines and various components positioned along those hydraulic lines which can inhibit the rapid backflow of hydraulic fluid.

Figure 5:
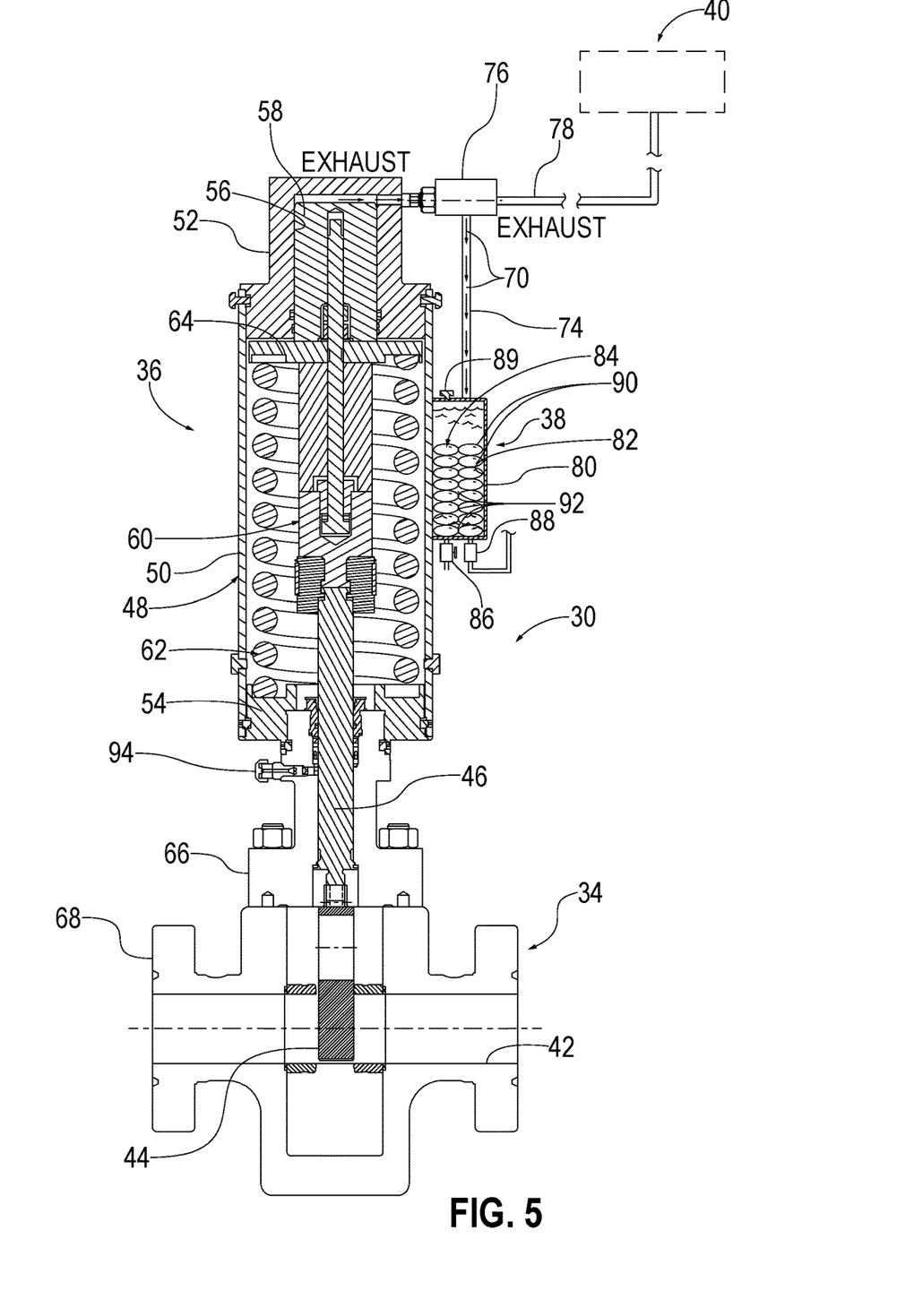
FIG. 5 is a cross-sectional illustration similar to that of FIG. 4 but showing the hydraulic valve actuator and the valve in a different operational position, according to an embodiment of the disclosure.

By placing the dump tank 38 close to port(s) 72 via a relatively short supply passage 70, very little resistance is provided with respect to the outflow of fluid from piston chamber 56 and into dump tank 38. In some embodiments, for example, the dump tank 38 may be mounted directly along an exterior of actuator housing 48 as illustrated. The quick exhaust valve 76 (or other suitable valve) may be in the form of or may comprise a check valve oriented to allow the rapid flow of fluid into dump tank 38 while preventing flow of hydraulic fluid from dump tank 38 back into valve actuator 36.

If energizer element 84, e.g. compressible balls 92, are disposed within dump tank 38, the inflow of hydraulic fluid into the dump tank 38 will compress the energizer element 84, as illustrated in FIG. 5. The compression of energizer element 84 effectively stores energy in the contained hydraulic fluid to facilitate subsequent discharge of that hydraulic fluid from the interior 82 of dump tank 38. For example, the energizer element 84 effectively causes increased pressure within dump tank 38 to facilitate discharge of hydraulic fluid from dump tank 38 when desired.

Figure 6:
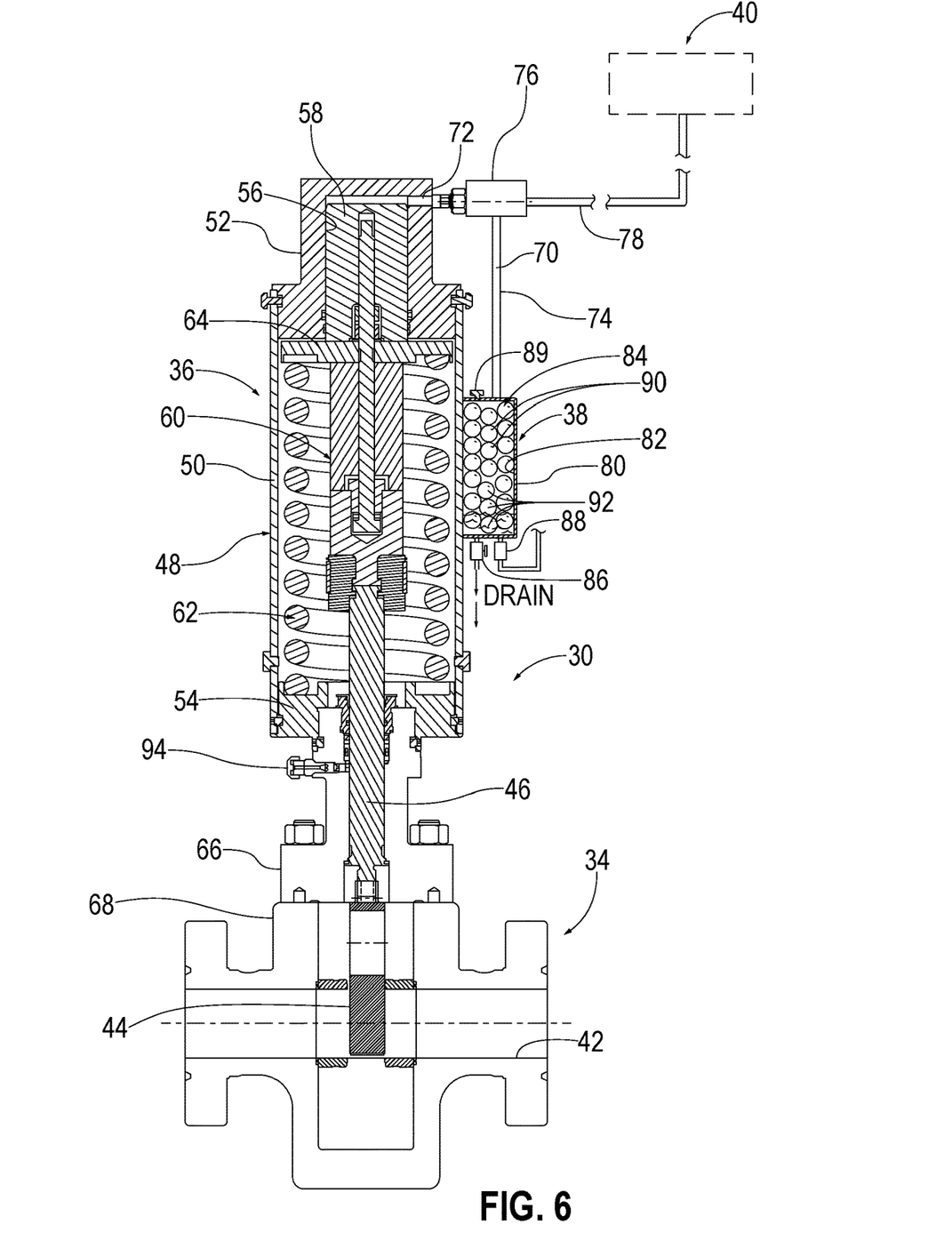
FIG. 6 is a cross-sectional illustration similar to that of FIG. 5 but showing the hydraulic valve actuator and the valve in a different operational position, according to an embodiment of the disclosure.

In some embodiments, a suitable discharge valve, e.g. discharge valve 86 and/or return valve 88, may be opened to release the hydraulic fluid from dump tank 38. The discharge of hydraulic fluid from dump tank 38 allows the energizer element 84, e.g. compressible balls 92, to return to their original condition, as illustrated in FIG. 6.

Figure 7:
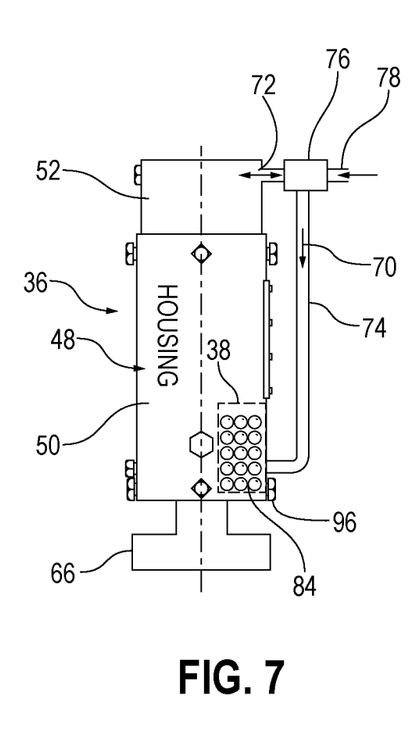
FIG. 7 is a cross-sectional illustration of another example of a hydraulic valve actuator coupled with a dump tank, according to an embodiment of the disclosure.

Referring generally to FIG. 7, another embodiment of valve actuator 36 is illustrated. In this example, the dump tank 38 is located within the actuator housing 48 rather than being mounted along the exterior of valve actuator 36. Again, various types of energizer elements 84 may be positioned within the dump tank 38. The flow passage 70 is in communication with dump tank 38 through the actuator housing 48. Additionally, an outlet plug 96 may be constructed to provide fluid communication with dump tank 38 through actuator housing 48. The outlet plug 96 may be coupled in fluid communication with suitable valves, e.g. valves 86 and/or 88, or other devices to facilitate the controlled discharge of hydraulic fluid from dump tank 38.

Figure 8:
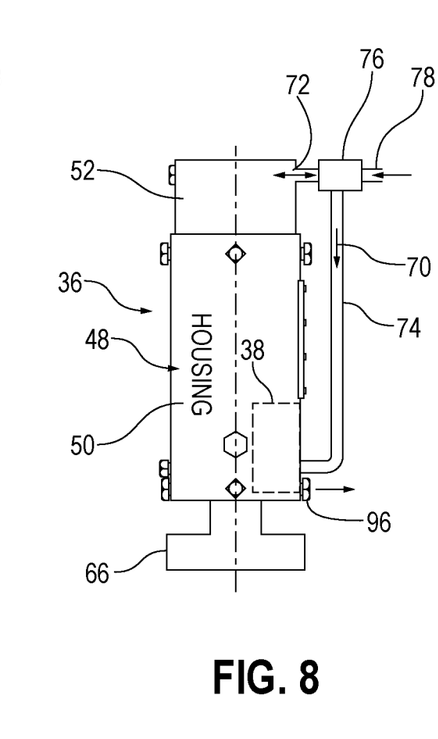
FIG. 8 is a cross-sectional illustration of another example of a hydraulic valve actuator coupled with a dump tank, according to an embodiment of the disclosure.

In FIG. 8, another embodiment of valve actuator 36 is illustrated. In this example, the dump tank 38 is again located within the actuator housing 48 rather than being mounted along the exterior of valve actuator 36. However, the dump tank 38 does not include energizer element 84. Instead, a pumping system, gravity feed system, suction system, or other suitable system may be coupled with outlet plug 96 to pump out or otherwise facilitate discharge of hydraulic fluid from the interior of dump tank 38.

Figure 9:
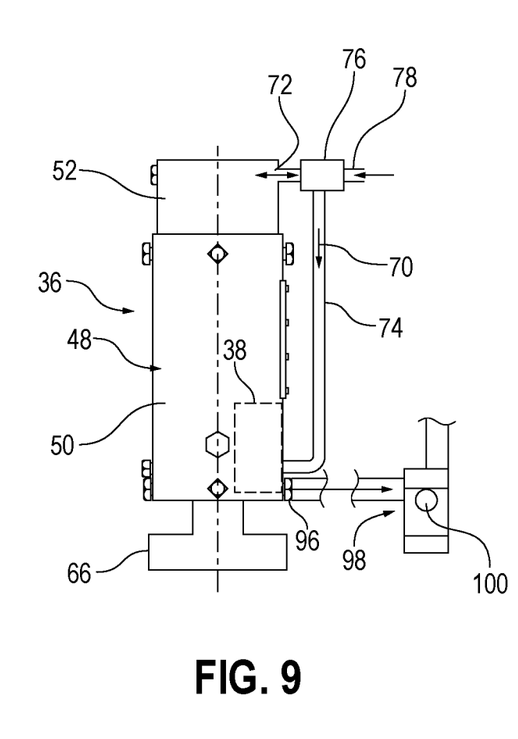
FIG. 9 is a cross-sectional illustration of another example of a hydraulic valve actuator coupled with a dump tank, according to an embodiment of the disclosure.

Referring generally to FIG. 9, another embodiment of valve actuator 36 is illustrated. In this example, the dump tank 38 is illustrated as coupled with a sensor system 98 which may comprise various types of sensors 100, e.g. hydraulic fluid level sensors, pressure sensors, and/or other sensors to monitor parameters related to the dump tank 38 and thus operation of valve actuator 36. The sensor system 98 may be used with dump tanks 38 located within actuator housing 48, mounted on the exterior of actuator housing 48, or positioned at other suitable locations.

Depending on the specifics of a given well operation and/or well environment, the valve system 30 may comprise various types of valves 34, valve actuators 36, dump tanks 38, hydraulic supply systems 40, and/or sensor systems 98. Additionally, various types of energizer elements 94 may be used within an internal or external dump tank 38. However, other types of systems may be used to discharge hydraulic fluid from the dump tank 38 following, for example, an emergency closure of the corresponding valve 34. For example, various pumps may be coupled with the dump tank 38 via, for example, outlet plug 96 to enable pumping of hydraulic fluid from the interior of the dump tank 38. Examples of such pumps include hand powered suction pumps or pneumatic pumps.

In general, embodiments of the valve system 30 enable a much more rapid actuation time with respect to the valve 34. For example, the valve system 30 may be used to enable a rapid closing of the valve 34 in an emergency situation or other situation. Depending on the parameters of a given valve system application, the hydraulic fluid may be rapidly flowed into dump tank 38 and then discharged in a controlled manner by returning the hydraulic fluid to the hydraulic fluid supply system 40 or to another appropriate collection location.

Additionally, the dump tank 38 may be assembled with the valve actuator 36 as original equipment. Or, the dump tank 38 and associated flowlines and components may be retrofitted to a given valve actuator 36. In some embodiments, the combined valve actuator 36 and dump tank 38 may be retrofitted to suitable corresponding valves 34. The dump tank 38 may be constructed as a relatively simple assembly to facilitate retrofitting as a kit.

The system may be used with various types of valves and valve actuations, including rising stem valves, non-rising stem valves, fail "as is" valves, fail "close" valves, horizontally mounted valves, vertically mounted valves, and other types of valves and valve actuation techniques. By way of example, the valve actuator 36 and dump tank 38 may be used with a shutdown valve (SDV), an emergency shutdown (ESD) valve, a surface safety valve (SSV), a high integrity pressure protection system (HIPPS) valve, or various other types of valves.

In some applications, use of the dump tank 38 also can help avoid back-pressure restrictions on, for example, the hydraulic supply system. Additionally, the valve system 30 may be used for prolonged periods without maintenance. The valve system 30 also may be digitized and remotely monitored. Furthermore, the dump tank 38 may be installed in communication with an existing supply line to facilitate drainage back to a reservoir. Various types of sensors 100 may be used to, for example, provide indications as to when the dump tank 38 should be drained.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system for use in facilitating rapid valve actuation, comprising:
    a valve actuator having:
    an actuator housing defining a piston chamber;
    a piston slidably positioned in the piston chamber;
    an actuator member coupled to the piston; and
    a spring biasing the piston and the actuator member to a first operational position, the actuator housing further comprising a port through which hydraulic fluid may be delivered to the piston chamber from a hydraulic supply line and under sufficient pressure to shift the piston against the spring to transition the piston and the actuator member to a second operational position; and
    a dump tank in fluid communication with the piston chamber to receive hydraulic fluid rather than returning hydraulic fluid to the hydraulic supply line during rapid transition of the valve actuator from the second operational position to the first operational position, the dump tank comprising an energizer element which energizes when the hydraulic fluid is received into the dump tank, the energizer element facilitating discharge of the hydraulic fluid from the dump tank.

2. The system as recited in claim 1, wherein the dump tank is mounted along an exterior of the actuator housing.

3. The system as recited in claim 1, wherein the dump tank is mounted along an interior of the actuator housing.

4. The system as recited in claim 1, wherein the energizer element comprises a compressible element.

5. The system as recited in claim 4, wherein the compressible element comprises a plurality of compressible balls.

6. The system as recited in claim 1, further comprising a valve coupled to the actuator member.

7. The system as recited in claim 6, wherein the first operational position of the valve actuator corresponds with a closed position of the valve.

8. The system as recited in claim 6, wherein the second operational position of the valve actuator corresponds with an open position of the valve.

9. The system as recited in claim 6, wherein the valve is a gate valve.

10. The system as recited in claim 1, wherein the dump tank is in fluid communication with the piston chamber via a quick exhaust valve and the port.

11. A system, comprising:
a valve;
a valve actuator coupled to the valve to actuate the valve between closed and open positions;
a hydraulic supply system coupled to the valve actuator via a hydraulic supply line to supply hydraulic fluid under pressure for shifting the valve actuator when actuating the valve from the closed position to the open position; and
a dump tank coupled to the valve actuator in a manner to receive hydraulic fluid discharged from the valve actuator rather than returning the hydraulic fluid through the hydraulic supply line during rapid closure of the valve; wherein the dump tank comprises a discharge valve to facilitate controlled discharge of fluid from the dump tank.

12. The system as recited in claim 11, wherein the valve actuator comprises an actuator housing defining a piston chamber; a piston slidably positioned in the piston chamber; an actuator member coupled to the piston and to the valve; and a spring biasing the piston and the valve to a closed position, the actuator housing further comprising a port through which hydraulic fluid may be delivered to the piston chamber from the hydraulic supply line and under sufficient pressure to shift the piston against the spring to transition the piston and the valve to an open position.

13. The system as recited in claim 12, wherein the dump tank is mounted along an exterior of the actuator housing.

14. The system as recited in claim 12, wherein the dump tank is mounted along an interior of the actuator housing.

15. The system as recited in claim 11, wherein the dump tank comprises an energizer element which energizes when the hydraulic fluid is received into the dump tank, the energizer element facilitating discharge of the hydraulic fluid from the dump tank.

16. The system as recited in claim 15, wherein the energizer element comprises a plurality of compressible enclosures.

17. A method, comprising:
coupling a hydraulic valve actuator with a dump tank;
providing the hydraulic valve actuator with a spring biased piston slidably mounted in a piston chamber such that introduction of hydraulic fluid into the piston chamber under pressure shifts the spring biased piston and causes the hydraulic valve actuator to shift from a first operational position to a second operational position;
maintaining fluid communication between the piston chamber and the dump tank such that release of pressure on the hydraulic fluid enables the spring biased piston to rapidly discharge hydraulic fluid from the piston chamber into the dump tank, and
providing the dump tank with an energizer element which energizes when the hydraulic fluid is received into the dump tank and facilitates discharge of the hydraulic fluid from the dump tank.

18. The method as recited in claim 17, further comprising connecting the hydraulic valve actuator with a valve in a well system.

19. The method as recited in claim 18, further comprising shifting the valve from a closed position to an open position by introducing the hydraulic fluid into the piston chamber via a hydraulic supply line in fluid communication with the piston chamber and with a hydraulic fluid supply system.

* * * * *